(12) United States Patent
Lee et al.

(10) Patent No.: US 12,441,678 B2
(45) Date of Patent: Oct. 14, 2025

(54) SPHINGOLIPID, AND DERMATOLOGIC COMPOSITION COMPRISING SAME FOR EXTERNAL APPLICATION

(71) Applicant: Croda Korea Ltd, Iksan-si (KR)

(72) Inventors: Kwanhyoung Lee, Yongin-si (KR); Ara Kim, Yongin-si (KR); Jihye Han, Yongin-si (KR); Sojung Lim, Yongin-si (KR); Juyeon Lee, Yongin-si (KR); Heesun Kim, Yongin-si (KR); Youngbeom Kim, Yongin-si (KR); Daebang Seo, Yongin-si (KR)

(73) Assignee: CRODA KOREA LTD, Iksan-si (KR)

( * ) Notice: Subject to any disclaimer, the term of this patent is extended or adjusted under 35 U.S.C. 154(b) by 428 days.

(21) Appl. No.: 18/005,072

(22) PCT Filed: Dec. 21, 2020

(86) PCT No.: PCT/KR2020/018733
§ 371 (c)(1),
(2) Date: Jan. 11, 2023

(87) PCT Pub. No.: WO2022/014803
PCT Pub. Date: Jan. 20, 2022

(65) Prior Publication Data
US 2023/0339848 A1 Oct. 26, 2023

(30) Foreign Application Priority Data

Jul. 14, 2020 (KR) .................. 10-2020-0086970

(51) Int. Cl.
| | | |
|---|---|---|
| C07C 233/05 | (2006.01) | |
| A61K 8/68 | (2006.01) | |
| A61K 31/164 | (2006.01) | |
| A61Q 5/00 | (2006.01) | |

(Continued)

(52) U.S. Cl.
CPC .............. *C07C 233/05* (2013.01); *A61K 8/68* (2013.01); *A61K 31/164* (2013.01); *A61Q 5/002* (2013.01); *A61Q 19/007* (2013.01); *A61Q 19/08* (2013.01)

(58) Field of Classification Search
None
See application file for complete search history.

(56) References Cited

FOREIGN PATENT DOCUMENTS

| | | |
|---|---|---|
| JP | H11343249 A | 12/1999 |
| JP | 2020-045308 A | 3/2020 |
| KR | 10-2004-0110996 A | 12/2004 |

(Continued)

OTHER PUBLICATIONS

Katsuhiro Kita et al., "Activation of bacterial ceramidase by anionic glycerophospholipids: possible involvement in ceramide hydrolysis on atopic skin by Pseudomonas ceramidase", Biochemical Journal, 2002, pp. 619-626, vol. 362.

(Continued)

*Primary Examiner* — Nicole P Babson
(74) *Attorney, Agent, or Firm* — Buchanan Ingersoll & Rooney PC

(57) ABSTRACT

A novel sphingolipid is disclosed. The novel sphingolipid is in liquid form at room temperature due to a low melting point, and blends easily with a variety of vegetable and/or animal oils. A dermatologic composition for external application containing the novel sphingolipid is also disclosed. The composition is useful in providing anti-inflammatory protection, improving moisturization, protecting the skin from ultraviolet (UV) light, or enhancing skin barriers.

19 Claims, 5 Drawing Sheets

(51) Int. Cl.
*A61Q 19/00* (2006.01)
*A61Q 19/08* (2006.01)

(56) References Cited

FOREIGN PATENT DOCUMENTS

| | | |
|---|---|---|
| KR | 10-2014-0086241 A | 7/2014 |
| KR | 10-2020-0042687 A | 4/2020 |

OTHER PUBLICATIONS

International Search Report for PCT/KR2020/018733 dated Apr. 8, 2021.
Office Action (The Third Office Action) issued Nov. 16, 2024, by the National Intellectual Property Administration, P. R. China in corresponding Chinese Patent Application No. 202080103740.1. (7 pages).

Novel sphingolipid (O-acetyl ceramide) in Oil series

MCT    PTG    Argan oil    Macadamia nut oil    Hexandiol

Moisturization increase (%)

- - - - - Comparative Example 2
———— Example 2

SPHINGOLIPID, AND DERMATOLOGIC COMPOSITION COMPRISING SAME FOR EXTERNAL APPLICATION

CROSS REFERENCE TO RELATED APPLICATIONS

This application is a National Stage of International Application No. PCT/KR2020/018733 filed Dec. 21, 2020, claiming priority based on Korean Patent Application No. 10-2020-0086970 filed Jul. 14, 2020.

TECHNICAL FIELD

The present invention relates to a novel sphingolipid, which is present in a liquid form at room temperature due to a low melting point thereof and has solubility in various oils, and to a composition for external application to the skin containing the same, and specifically to a pharmaceutical composition, cosmetic composition, or quasi-drug composition containing the same.

BACKGROUND ART

The stratum corneum, which is the outermost layer of the skin, is composed of dead corneocytes serving as bricks and intercellular lipid components surrounding the dead corneocytes like cement. The dead corneocytes constituting the stratum corneum contain high-concentration natural moisturizing factors, water-soluble components, which allow the skin to exhibit elasticity as well as maintain an appropriate level of water. In other words, natural moisturizing factors, sebum, and inter-corneocyte lipid components, which are products of epidermal differentiation, and the proper exfoliation of the stratum corneum act as important factors, in order to maintain an appropriate level of water in the stratum corneum, and an imbalance or lack of these elements may cause dry skin. Several studies have been conducted on the correlation between dry skin and ceramides, a main component among the inter-corneocyte lipid components, and revealed that the ceramide content and the fatty acid length were shortened in the dry skin.

Ceramides are a specific group of sphingolipids in which a fatty acid is bonded to sphingosine or phytosphingosine via an amide bond. Ceramides account for about 40% of inter-corneocyte lipids constituting the stratum corneum and are an essential component to form structures of the stratum corneum and perform functions thereof. Ceramides have a role of lipid barriers that inhibit the evaporation of water and a function of maintaining the orderly structure of the stratum corneum. These ceramides have excellent moisturizing efficacy, but the ceramides are poorly soluble substances and thus have many limitations in their use. For example, when ceramides are introduced into an aqueous phase or an oil phase in order to prepare a preparation for application to the skin, very high temperature is required to dissolve ceramides, and a low temperature results in precipitation of ceramides. The recent development of techniques for increasing the solubility of ceramides through liposomes, encapsulation, or the like promotes the use of ceramides, but large amounts of emulsifiers or only very small amounts of ceramides need to be still used.

DISCLOSURE OF INVENTION

Technical Problem

The present inventors discovered that a predetermined substance obtained by acylation of a natural ceramide derived from a plant or an animal is a novel sphingolipid that exhibits efficacy inherent to the ceramide, is present in a liquid phase at room temperature due to its low melting point, and has excellent solubility in various oils, and thus completed the present invention.

Accordingly, an aspect of the present invention is to provide the novel sphingolipid.

Another aspect of the present invention is to provide a composition for external application to the skin, which contains the above-described sphingolipid as an active ingredient and is used for anti-inflammation, improving moisturization, protecting the skin from ultraviolet (UV) light, or enhancing skin barriers, and specifically a pharmaceutical composition for external application to the skin, a cosmetic composition, or a quasi-drug composition.

Other purposes and advantages of the present disclosure will be clarified by following detailed description and claims.

Solution to Problem

In accordance with an aspect of the present invention, there is provided a novel sphingolipid represented by Chemical Formula 1.

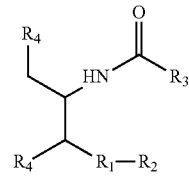

[Chemical Formula 1]

wherein, $R_1$ is $CH_2$—$CH_2$, CH═CH, or C(H) $R_4$—$CH_2$;

$R_2$ is a saturated or unsaturated aliphatic hydrocarbon group of 12 to 28 carbon atoms;

$R_3$ is a saturated or unsaturated aliphatic hydrocarbon group of 12 to 28 carbon atoms substituted or unsubstituted with a hydroxyl group; and a plurality of $R_4$'s are the same as or different from each other and are each independently an aliphatic acyl group of 1 to 6 carbon atoms or a hydroxyl (OH) group, provided that at least one of the plurality of $R_4$'s contains at least an aliphatic acyl group of 1 to 6 carbon atoms.

In an embodiment according to the present invention, the sphingolipid represented by Chemical Formula 1 may contain an acetyl ($CH_3CO$—) group in at least one of the plurality of $R_4$'s.

In an embodiment according to the present invention, $R_3$ of Chemical Formula 1 may include, as a raw material, an oil derived from at least one supply source of sea buckthorn, palm, sunflower, rapeseed, canola, olive, coconut, soybean, horse, cattle, sheep, bee, fish, crustacean, and human.

In an embodiment according to the present invention, the sphingolipid may have a melting point (mp) of 40° C. or lower.

In an embodiment according to the present invention, the sphingolipid may have solubility in at least one oil of plant oils, animal oils, fraction oils, and synthetic oils.

In an embodiment according to the present invention, in thin layer chromatography (TLC) using development solvents (chloroform:methanol:formic acid=190:15:1 (volume ratio)), the Rf value of the sphingolipid may be higher than the Rf value of an unacylated ceramide.

In an embodiment according to the present invention, the sphingolipid may have a pH of 3 to 7.

In accordance with another aspect of the present invention, there is provided a composition for external application to the skin containing, as an active ingredient, the above-described novel sphingolipid, a pharmaceutically acceptable salt thereof, or a solvate thereof.

In an embodiment according to the present invention, the composition for external application to the skin may be used for anti-inflammation, improving moisturization, or enhancing skin barriers.

In an embodiment according to the present invention, the composition for external application to the skin may be used for repairing skin damage induced by ultraviolet (UV) light or alleviating skin irritation.

In an embodiment according to the present invention, the composition for external application to the skin may be used for hair damage prevention, hair moisturization, lip moisturization, or lip protection.

In an embodiment according to the present invention, the novel sphingolipid may be contained at an amount of 0.00001 to 50 wt % relative to the total weight of the composition.

In an embodiment according to the present invention, the composition for external application to the skin may further include at least one of phytosphingosine, sphingosine, and sphinganine.

In an embodiment according to the present invention, the composition for external application to the skin may further include at least one of ceramide 1 (EOS), ceramide 2 (NS), ceramide 3 (NP), ceramide 4 (EOH), ceramide 5 (AS), ceramide 6 (NH), ceramide 7 (AP), ceramide 8 (AH), and ceramide 9 (EOP).

In an embodiment according to the present invention, the composition for external application to the skin may be an oil formulation containing no emulsifier.

In accordance with still another aspect of the present invention, there is provided a pharmaceutical composition containing the above-described composition for external application to the skin.

In accordance with still another aspect of the present invention, there is provided a cosmetic composition containing the above-described composition for external application to the skin.

In accordance with still another aspect of the present invention, there is provided a quasi-drug composition containing the above-described composition for external application to the skin.

In accordance with still another aspect of the present invention, there is provided a method for preparing a cosmetic composition, the method including the steps of: (i) preparing a lipid phase by dissolving, in an oil, a novel sphingolipid represented by Chemical Formula 1, cholesterol, a fatty acid, and a phospholipid; (ii) preparing an aqueous phase by mixing water with a mixture of a sphingolipid and an organic acid; and (iii) mixing the lipid phase in step (i) and the aqueous phase in step (ii) under heating, followed by addition of a preservative.

Advantageous Effects of Invention

According to an embodiment of the present invention, the novel sphingolipid represented by Chemical Formula 1 is in a liquid form at room temperature due to a low melting point thereof and is a substance having excellent solubility in and miscibility with various oils and thus can be easily formulated into various dosage forms without the use of a separate emulsifier and the application of high temperature, and the novel sphingolipid has excellent moisturization and skin barrier function enhancing ability and thus can be applied to products for r external application to the skin for all purposes to which conventional ceramides and sphingolipids are applied.

Therefore, in the present invention, the above-described novel sphingolipid can be advantageously used as an active ingredient for compositions for pharmaceutical products, cosmetic products, and quasi-drug products for anti-inflammation, improving moisturization, enhancing skin barriers, repairing skin damage induced by ultraviolet (UV) light, alleviating skin irritation, moisturizing lips, or protecting lips.

The advantageous effects according to the present invention are not limited by the contents exemplified above, and more various advantageous effects are included herein.

MODE FOR CARRYING OUT THE INVENTION

Figure 1:
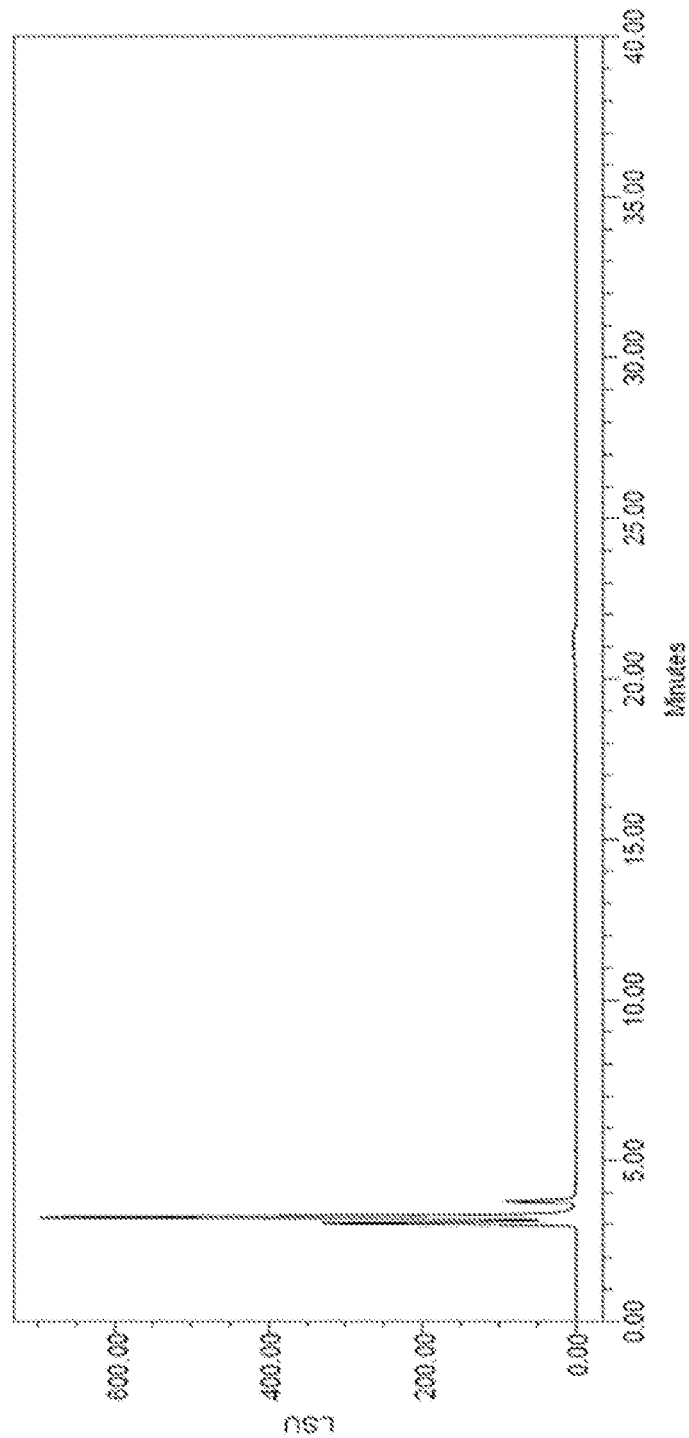
FIG. 1 shows the high performance liquid chromatograph (HPLC) analysis results of a novel sphingolipid according to an embodiment of the present invention.

Hereinafter, the present invention will be described in detail.

All terms (including technical and scientific terms) used in this specification, unless otherwise defined, may be used in the meaning commonly understood by those of ordinary skill in the art to which the present invention pertains. In addition, terms defined in a commonly used dictionary are not to be interpreted ideally or excessively unless clearly defined in particular.

In addition, throughout this specification, when a part is said to "comprise", "include", or "contain" a certain element, it means that other elements may be further included, rather than excluding other elements, unless otherwise stated. In addition, throughout the specification, "above" or "on" means not only when it is located above or under the target part, but also includes the case where there is another part in the middle, and it does not mean that it is positioned above with respect to the direction of gravity.

The present invention relates to a novel sphingolipid having a liquid phase at room temperature and oil-solubility and use thereof.

Herein, the room temperature refers to common room temperature known in the art, and may mean, for example, 10 to 40° C., specifically 10 to 30° C., and more specifically 20±5° C.

Specifically, the novel sphingolipid of the present invention has a structure including at least one O-acyl group in the molecular structure, unlike conventional ceramides or sphingolipids. Such a novel sphingolipid is not only present in a liquid form at room temperature due to a low melting point of 40° C. or lower, but is also soluble in various oils (e.g., plant oils, animal oils, fraction oils, and synthetic oil), and thus can be easily dispersed in and miscible with the various oils. Therefore, the novel sphingolipid according to the present invention is easily formulated into various forms without the use of a separate emulsifier and can be advantageously used particularly for hair and/or color cosmetic products employing oil-based formulations.

In addition, the novel sphingolipid retains excellent moisturizing ability and skin barrier function enhancing ability inherent to existing ceramides or sphingolipids, and thus can be applied to a composition for external application to the skin, specifically a pharmaceutical composition, a cosmetic composition, and/or a quasi-drug composition, of which main functions are to increase skin moisturizing ability, prevent skin drying, reduce transepidermal water loss, and/ or enhance the basic skin.

<Novel Sphingolipid>

An aspect of the present invention is directed to a sphingolipid represented by chemical formula 1 and a derivative thereof, a pharmaceutically acceptable salt thereof, or a solvate thereof.

[Chemical Formula 1]

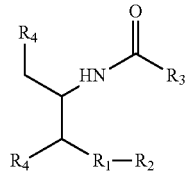

wherein, $R_1$ is $CH_2$—$CH_2$, $CH$=$CH$, or $C(H)R_4$—$CH_2$;

$R_2$ is a saturated or unsaturated aliphatic hydrocarbon group of 12 to 28 carbon atoms;

$R_3$ is a saturated or unsaturated aliphatic hydrocarbon group of 12 to 28 carbon atoms substituted or unsubstituted with a hydroxyl group; and a plurality of $R_4$'s are the same as or different from each other and are each independently an aliphatic acyl group of 1 to 6 carbon atoms or a hydroxyl (OH) group, provided that at least one of the plurality of $R_4$'s contains at least an aliphatic acyl group of 1 to 6 carbon atoms.

In a specific example of Chemical Formula 1 above, $R_2$ is a common aliphatic hydrocarbon group known in the art, and specifically may be a straight or branched chain alkyl, alkenyl, or alkynyl group of 12 to 20 carbon atoms.

$R_3$ is a common aliphatic hydrocarbon group known in the art, and specifically may be a straight or branched chain alkyl, alkenyl, or alkynyl group of 12 to 24 carbon atoms containing or not containing a hydroxyl group (OH). $R_3$ may include, as a raw material, an oil derived from at least one natural supply source of sea buckthorn, palm, sunflower, rapeseed, canola, olive, coconut, soybean, horse, cattle, sheep, bee, fish, crustacean, and human.

In addition, the plurality of $R_4$'s may be the same as or different from each other and may be each independently an aliphatic acyl group or a hydroxyl (OH) group. Specifically, the plurality of $R_4$'s may be each independently ethanoyl ($CH_3CO$—) or a hydroxyl group and, more specifically, $R_4$ contained in $R_1$ and at least one of two Ra's are preferably ethanoyl ($CH_3CO$—, acetyl group).

In a preferable embodiment of the present invention, the compound of Chemical Formula 1 may be further embodied into any one of Chemical Formulas 2 to 7 below. However, the compound is not limited thereto.

[Chemical Formula 2]

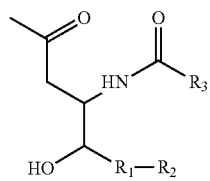

[Chemical Formula 3]

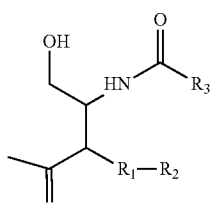

[Chemical Formula 4]

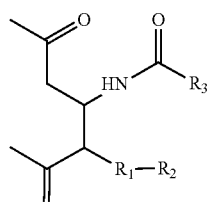

[Chemical Formula 5]

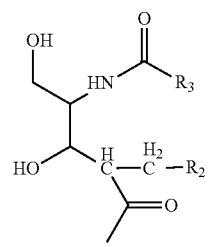

[Chemical Formula 6]

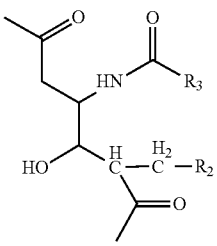

[Chemical Formula 7]

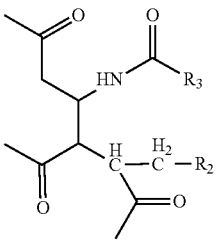

In Chemical Formulas 2 to 7, $R_1$ to $R_3$ are each defined as in Chemical Formula 1.

Since conventional ceramides generally have a high melting point (m.p) of 90° C. or higher, the separate application of high temperatures or the use of emulsifiers is necessarily required for the formulation of ceramides. Therefore, the formulating of conventional ceramides causes process complexity and additional process costs.

However, the novel sphingolipid represented by Chemical Formula 1 has a melting point (m.p) of 40° C. or less, and thus is present in a liquid form at room temperature. In addition, the sphingolipid contains at least one acetyl group in the chemical structure thereof and thus is easily miscible with and soluble in common oils known in the art (see FIG. 3 below). The novel sphingolipid of the present invention, which is oil-soluble at room temperature as described above, is easy to make into various formulations without the separate application of high temperatures or the use of emulsifiers and can also sufficiently exhibit the moisturizing ability and skin barrier function enhancing ability inherent to existing ceramides.

In one embodiment, the novel sphingolipid may have a melting point (m.p) of 40° C. or less. For example, the melting point may be 10 to 40° C., specifically 10 to 30° C., and more specifically 10 to 25° C.

In another embodiment, the novel sphingolipid may be a substance having solubility in at least one oil of plant oils, animal oils, fraction oils, and synthetic oils.

In another embodiment, in thin layer chromatography (TLC) using predetermined development solvents (chloroform:methanol:formic acid=190:15:1 (volume ratio)], the Rf value of the sphingolipid may be higher than the Rf value of an unacylated ceramide. Specifically, the Rf value of the sphingolipid may be 0.8 to 0.9, and the Rf value of an unacylated ceramide may be 0.4 to 0.5.

In still another specific embodiment, the novel sphingolipid may have an acidity (pH) of 3 to 7.

The present invention also provides a salt, preferably a pharmaceutically acceptable salt of a novel sphingolipid represented by Chemical Formula 1.

Herein, the term "pharmaceutically acceptable salt" refers to a salt suitable for use in contact with the tissues s of human beings and lower animals without excessive toxicity, irritation, allergic response, and the like within the scope of sound medical judgment. Such a pharmaceutically acceptable salt has been well known in the art and is described in detail in, for example, literature (S. M. Berge et al., J. Pharmaceutical Sciences, 66, 1, 1977). During the final isolation and purification of the compound of the present invention, the salt may be prepared in the same reaction system or may be prepared by separate reaction with an inorganic or organic base. Preferred examples of the base addition salt form may include: ammonium salts, alkali and earth alkaline metal salts, for example, salts of lithium, sodium, potassium, magnesium, calcium, and the like, salts with organic bases, for example, primary, secondary and tertiary aliphatic and aromatic amines, such as methylamine, ethylamine, propylamine, isopropylamine, four types of butylamine isomers, dimethylamine, diethylamine, diethanolamine, dipropylamine, diisopropylamine, di-n-butylamine, pyrrolidine, piperidine, morpholine, trimethylamine, triethylamine, tripropylamine, quinuclidine, pyridine, quinoline and isoquinoline, benzathine, N-methyl-D-glucamine, 2-amino-2-(hydroxymethyl)-1,3-propanediol, hydrabamine salts, and salts with amino acids, such as, arginine, lysine and the like.

The present invention may also include hydrates or solvates of the novel sphingolipid represented by Chemical Formula 1, or derivative compounds thereof. In the solvates, solvents are not particularly limited and may include all the common solvents known in the art.

The novel sphingolipid represented by Chemical Formula 1 may be isolated and purified from natural materials and subjected to predetermined treatment (acylation), or may be prepared by a chemical synthesis method known in the art.

In an embodiment, the novel sphingolipid represented by Chemical Formula 1 may be obtained by isolating a fatty acid oil derived from a natural material, for example, a natural plant (e.g., sea buckthorn, palm, sunflower, rapeseed, canola, olive, coconut, soybean, etc.) or an animal (e.g., horse, cattle, sheep, bee, fish, crustacean, human, etc.), followed by purification, and then separating a ceramide from the fatty acid oil, and then subjecting the separated ceramide to acylation by a conventional method known in the art.

In addition, the desired novel sphingolipid may be further subjected to a process, such as fractionation, for isolation and/or purification, and particularly, as a fraction solvent that is used, the extraction solvent may be used without limitation. The novel sphingolipid may be purified by using a purification method known in the art. As an example of the purification method, isolation purification may be performed by concentration and gradient chromatography combined with additional purification including reverse phase partition phase adsorption chromatography, chromatography, normal ion exchange chromatography, size exclusion chromatography, or a combination of one or more thereof. For the chromatography methods, column chromatography, high performance liquid chromatography (HPLC), and the like, which use the filling of various types of synthetic resins, such as silica gel and active alumina, may be used alone or in combination. However, the extraction and isolation purification of compounds is not essentially limited to the above methods.

The above-described novel sphingolipid represented by Chemical Formula 1, an isomer thereof, a pharmaceutically acceptable salt thereof, or a solvate thereof is easily dissolved and dispersed in various oils at room temperature while having excellent moisturizing effect and skin barrier function enhancing effect inherent to existing ceramides, and thus the novel sphingolipid can be advantageously used in all the fields to which ceramides or sphingolipid are applied.

<Composition for External Application to Skin>

Another aspect of the present invention is directed to a composition for external application to skin, the composition containing a novel sphingolipid represented by chemical formula 1 or a derivative thereof, a pharmaceutically acceptable salt thereof, or a solvate thereof, as an active ingredient.

As used herein, the term "active ingredient" refers to an ingredient that can alone show desired activity alone or together with a carrier that per se is not active.

As used herein, the term "composition for external application" refers to a preparation that is provided for external application, and the composition for external application to the skin may be formulated to contain a cosmetologically, pharmaceutically, or dermatologically acceptable medium or base. The composition may be provided in any formulation suitable for topical application, and as a specific example, a solution, a gel, a solid, an anhydrous product of a paste, an emulsion obtained by dispersing an oil phase in a water phase, a dispersion, a micro-emulsion, a microcapsule, micro-granules, or an ionic (liposome) or non-ionic vesicular dispersant, or in the form of a cream, a skin, a lotion, a powder, an ointment, a spray, a pack, or a concealer stick. The composition may also be used in the form of a foam or in the form of an aerosol composition further containing a compressed propellant, but is not limited thereto. These compositions may be prepared by common methods in the art.

The composition for external application to the skin containing the above-described composition novel sphingolipid of the present invention may be applied to all of the fields in which conventional ceramides or sphingolipids are used.

In a specific embodiment, the composition of the present invention may be a composition for external application to the skin, the composition having use for anti-inflammation, improving moisturization, enhancing skin barriers, repairing skin damage induced by ultraviolet (UV) light, relieving skin irritation, preventing hair damage, moisturizing hair, moisturizing lips, or protecting lips, and more specifically may be a pharmaceutical composition for external application to the skin, a cosmetic composition, and/or a quasi-drug composition. However, the composition of the present invention is not particularly limited thereto.

The content of the novel sphingolipid is not particularly limited, and may be appropriately adjusted within a common content range in which the above-described efficacy is exhibited. For example, the novel sphingolipid may be contained in a range of 0.00001 to 50 wt %, specifically, 0.0001 to 40 wt %, or more specifically 0.001 to 30 wt %, relative to the total weight (e.g., 100 wt %) of the corresponding composition.

The composition for external application to the skin according to the present invention may further contain common ingredients known in the art in addition to the above-described ingredient. For example, the composition may contain a ceramide, cholesterol, acid, phytosphingosine, a phospholipid, or a mixture thereof. The ceramide, cholesterol, fatty acid, and phytosphingosine are commonly main components constituting intercellular lipids, and the phospholipid is a main substance that constitutes cell walls and can effectively prevent the evaporation of water in the skin epidermis and maximize the water retention in the skin through similar structures and compositions to intercellular lipids.

In an embodiment, the composition for external application to the skin may further contain at least one of phytosphingosine, sphingosine, and sphinganine. The contents of the above-described ingredients are not particularly limited, and may be appropriately adjusted within a content range known in the art.

Ceramides are one of the intercellular lipid components constituting the stratum corneum of the skin, accounts for 40% or more of the skin lipids, and serve to maintain and restore skin barriers, and thus it is necessary to maintain or supplement ceramides in maintaining skin elasticity. Nine types of ceramides constitute the skin. Non-limiting examples of usable ceramides may be ceramide 1 (EOS), ceramide 2 (NS), ceramide 3 (NP), ceramide 4 (EOH), ceramide 5 (AS), ceramide 6 (NH), ceramide 7 (AP), ceramide 8 (AH), ceramide 9 (EOP), or a mixture thereof. The content of the ceramide is not particularly limited, and may be appropriately adjusted within a content range known in the art.

In the present invention, the composition for external application to the skin may be a pharmaceutical composition that can be applied to the skin, a cosmetic composition, or a quasi-drug composition, but is not particularly limited thereto.

In an embodiment, the composition for external application to the skin may be an oil formulation of composition containing no emulsifier. Such an emulsifier is not particularly limited thereto and may be a common ingredient known in the art.

<Pharmaceutical Composition>

Another aspect of the present invention is directed to a pharmaceutical composition containing the above-described composition for external application to the skin, and specifically, to a pharmaceutical composition for external application to the skin. In an embodiment, the pharmaceutical composition contains, as an active ingredient, the above-described novel sphingolipid represented by Chemical Formula 1, a pharmaceutically acceptable salt thereof, or a solvate thereof.

The pharmaceutical composition is preferably used for anti-inflammation, improving moisturization, enhancing skin barriers, repairing skin damage induced by ultraviolet (UV) light, relieving skin irritation, preventing hair damage, moisturizing hair, moisturizing lips, or protecting lips, but is not particularly limited thereto.

The pharmaceutical composition according to the present invention may further contain adjuvants, such as pharmaceutically suitable and physiologically acceptable carriers, excipients, and diluents, in addition to the above-described sphingolipid represented by Chemical Formula 1, a pharmaceutically acceptable salt thereof, or a solvate thereof. Representative examples of the pharmaceutically acceptable carriers, excipients, or diluents may include lactose, dextrose, sucrose, sorbitol, mannitol, xylitol, maltitol, starch, gelatin, glycerin, acacia gum, alginate, calcium phosphate, calcium carbonate, calcium silicate, cellulose, methyl cellulose, microcrystalline cellulose, polyvinyl pyrrolidone, water, methyl hydroxybenzoate, propyl hydroxybenzoate, talc, magnesium stearate, mineral oils, propylene glycol, polyethylene glycol, plant oils, injectable esters, Witepsol, Macrogol, Tween 61, cocoa butter, laurin butter, and the like. For example, the pharmaceutical composition may be made into a preparation by using an excipient, a binder, a disintegrant, a lubricant, a solubilizer, a suspending agent, a preservative, or an extender, which is known in the art.

The pharmaceutical composition may be formulated in any dosage form known in the art, such as a cream, a gel, a patch, a spray, an ointment, a plaster, a lotion, a liniment, a paste, or a cataplasm.

The usage of the novel sphingolipid of Chemical Formula 1 as an active ingredient in the pharmaceutical composition according to the present invention may be appropriately adjusted according to the type and purpose of use, condition of a patient, type and severity of symptoms. For example, a preferable dose of the pharmaceutical composition may vary depend on the condition, age, and weight of a patient, severity of a disease, dosage form of a drug, and route and period of administration, but may be selected as appropriate by an expert or a person skilled in the art. However, for desirable effects, the composition of the present invention is preferably administered at 0.0001 to 100 mg/kg, and preferably 0.001 to 10 mg/kg per day. External administration may be performed once or in divided doses per day. However, the external administration is not particularly limited thereto.

<Cosmetic Composition>

Another aspect of the present invention is directed to a cosmetic composition containing the above-described composition for external application to the skin. In an embodiment, the cosmetic composition contains, as an active ingredient, the above-described novel sphingolipid represented by Chemical Formula 1, a pharmaceutically acceptable salt thereof, or a solvate thereof.

The cosmetic composition is preferably used for anti-inflammation, improving moisturization, enhancing skin barriers, repairing skin damage induced by ultraviolet (UV) light, relieving skin irritation, preventing hair damage, moisturizing hair, moisturizing lips, or protecting lips, but is not particularly limited thereto.

The content of the sphingolipid of Chemical Formula 1 as an active ingredient in the cosmetic composition according to the present invention is not particularly limited and may be appropriately adjusted according to the type and purpose of use, skin condition, type and severity of symptoms, and the like.

In addition, the cosmetic composition of the present invention may contain ingredients that are commonly used in cosmetic compositions, in addition to the above-described novel sphingolipid represented by Chemical Formula 1, a pharmaceutically acceptable salt thereof, or a solvate thereof. For example, the cosmetic composition of the present invention may contain common adjuvants known in the art, such as stabilizers, solubilizers, vitamins, pigments, and flavors, carriers, and purified water, without limitation. The cosmetic composition of the present invention may further contain water-soluble vitamins, oil-soluble vitamins, high-molecular peptides, high-molecular polysaccharides, sphingolipids, natural extracts, waxes, oils, detergents, surfactants, colorants, and flavoring agents, which are commonly used in cosmetic compositions, within the scope of not impairing the purpose of the present invention.

The cosmetic composition of the present invention may be prepared in any formulation that is commonly prepared in the art, and the formulation may be appropriately selected according to the purpose. For example, the cosmetic composition of the present invention may take the formulation of a solution, an emulsion, or a viscous mixture, and as a specific example, the cosmetic composition may be formulated into at least one selected an from emollient lotion, an astringent lotion, a nourishing lotion, a nourishing essence, a nourishing oil, a moisturizing oil, a nourishing cream, a massage cream, a powder, a pack, a powder foundation, an emulsion foundation, a makeup base, a surfactant-containing cleansing, a gel, a lotion, a wax, a spray, a cosmetic solution, a hair cosmetic, and an ointment. However, the cosmetic composition is not limited thereto. The cosmetic composition is preferably in a formulation of a lotion, a cream, an essence, or the like to apply the ceramide to the skin.

Particularly, the novel sphingolipid according to the present invention is oil-soluble at room temperature without the use of a separate emulsifier, and has excellent miscibility, and thus can be advantageously used for hair care products and/or color cosmetic products for lips, such as lipsticks, which employ oil-based formulations.

In a specific embodiment of the present invention, the cosmetic composition may be used for lip moisturization or lip protection. The cosmetic composition for lips may be prepared in a formulation of at least one selected from the group consisting of a lip gloss, a lip balm, a lip cream, a lip treatment, and a lipstick, but is not particularly limited thereto.

In another embodiment of the present invention, the cosmetic composition may be used hair damage prevention, hair moisturization, hair conditioning, or hair dyeing. Such a cosmetic composition for hair is excellent in formulation stability and thus can be prepared into a convenient formulation. For example, the cosmetic composition may be configured in a mist type, a serum type, or a leave-on type, and specifically may be formulated into a hair shampoo, a hair conditioner, a hair treatment, a hair tonic, a scalp treatment, a hair lotion, a hair cream, a hair nourishing lotion, or a common ointment. However, the cosmetic composition of the present invention is not particularly limited thereto.

A method for preparing the cosmetic composition according to the present invention is not particularly limited, and a method known in the art can be applied without limitation. Hereinafter, the preparation method is not limited only by the following preparation methods, wherein respective process steps may be modified or selectively mixed as needed.

An example of the preparation method may include steps of: (i) preparing a lipid phase by dissolving, in an oil, a novel sphingolipid represented by Chemical Formula 1, cholesterol, a fatty acid, and a phospholipid; (ii) preparing an aqueous phase by mixing water with a mixture of a sphingolipid and an organic acid; and (iii) mixing the lipid phase in step (i) and the aqueous phase in step (ii) under heating, followed by addition of a preservative.

As the cholesterol used in the present invention, any common substance that is known in the art may be used.

As the phospholipid, any common ingredient known in the art may be used without limitation, and non-limiting examples thereof may include hydrogenated lecithin, hydrogenated phosphatidylcholine, phospholipids, hydrogenated lysophosphatidylcholine, hydrogenated lysolecithin, hydroxylated lecithin, unsaturated lecithin, or a mixture of one or more thereof.

As the fatty acid, any common ingredient known in the art may be used, and for example, a straight chain saturated fatty acid of 12 to 30 carbon atoms, and preferably 18 to 26 carbon atoms, may be used. Non-limiting examples of the fatty acid include lauric acid, myristic acid, palmitic acid, stearic acid, oleic acid, branched chain lauric acid, branched chain myristic acid, branched chain palmitic acid, branched chain stearic acid, branched chain oleic acid, or a mixture of one or more thereof.

In step (i), the lipid phase containing the novel sphingolipid, cholesterol, fatty acid, and phospholipid is preferably added to the oil and then dissolved under heating at 80 to 85° C. As the oil, any common ingredient known in the art may be used, and examples thereof may include silicone oils, hydrocarbon oils, higher fatty acid oils, ester oils, glyceride oils, lanolin oils, plant oils, or mixtures thereof.

The sphingolipid of step (ii) is an essential ingredient of a composition for simulating a skin constituent component and is different from the novel sphingolipid of step (i). As the sphingolipid, a common sphingolipid known in the art may be used without limitation, and for example, a common sphingolipid, such as PY or a ceramide, may be used.

The cosmetic composition according to the present invention may be prepared by mixing the lipid phase, dissolved under heating, with the aqueous phase under heating and then optionally adding the preservative.

The content ratio (mixing ratio) of the lipid phase and the aqueous phase is not particularly limited, and may be appropriately adjusted within a range known in the art.

The aqueous phase may have a temperature of 75 to 80° C. As the aqueous phase, a polyhydric alcohol, water, or a mixture thereof may be used, and preferably, the aqueous phase may be a mixture of a polyhydric alcohol and water.

<Quasi-Drug Composition>

Another aspect of the present invention is directed to a quasi-drug composition containing the above-described composition for external application to the skin. In an embodiment, the quasi-drug composition contains, as an active ingredient, the above-described novel sphingolipid represented by Chemical Formula 1, a pharmaceutically acceptable salt thereof, or a solvate thereof.

The quasi-drug composition is preferably used for anti-inflammation, improving moisturization, enhancing skin barriers, repairing skin damage induced by ultraviolet (UV) light, relieving skin irritation, preventing hair damage, moisturizing hair, moisturizing lips, or protecting lips, but is not particularly limited thereto.

The quasi-drug composition may further contain a pharmaceutically acceptable carrier, excipient, or diluent as needed, in addition to the above-described ingredient. The pharmaceutically acceptable carrier, excipient, or diluent is not limited as long as they do not impair the effects of the present invention, and examples thereof may include a filler, an extender, a binder, a wetting agent, a disintegrant, a surfactant, a lubricant, a sweetener, an aroma, a preservative, and the like.

The composition containing a novel sphingolipid as an active ingredient of the present invention, when used as a quasi-drug product, may further contain at least one active ingredient that exhibits the equivalent or similar function to the novel sphingolipid. Such an ingredient may be added considering skin safety, easiness of formulation, and stability of active ingredients due to the combined use. The quasi-drug composition may further contain: as a whitening ingredient known in the art, a substance inhibiting tyrosinase activity, such as Kojic acid and arbutin, hydroquinone, and vitamin-C(L-Ascorbic acid); as an ingredient for skin elasticity, wrinkle relief, or moisturization known in the art, retinoic acid, TGF, a protein derived from animal placenta, betulinic acid, and a *chlorella* extract; and at least one selected from the group consisting of derivatives thereof and various plant extracts. The contents of the added ingredients are not particularly limited, and may be 0.0001 to 5 wt % relative to the total weight of the corresponding composition, and the content range may be appropriately adjusted according to requirements, such as skin safety and easiness.

The quasi-drug composition of the present invention may be, for example, a disinfectant cleanser, a shower foam, an ointment, a wet tissue, a coating agent, and the like. However, the quasi-drug composition of the present invention is not particularly limited, and a formulation method, a dose, a use method, ingredients, and the like of the quasi-drug may be selected as appropriate from conventional techniques known in the art.

Furthermore, the quasi-drug composition containing the novel sphingolipid as an active ingredient of the present invention may be used for anti-inflammation, improving moisturization, enhancing skin barriers, repairing skin damage induced by ultraviolet (UV) light, relieving skin irritation, moisturizing lips, or protecting lips, which includes a step of applying the quasi-drug composition to the skin of a subject. The subject may include mammals including mice, rats, livestock, humans, and the like without limitation.

Hereinafter, the present invention will be described in more detail with reference to examples. These examples are provided only for the purpose of illustrating the present invention in more detail, and therefore, according to the purpose of the present invention, it would be apparent to a person skilled in the art that these examples are not construed to limit the scope of the present invention.

Example 1: Preparation of Novel Sphingolipid 1-1. Sea Buckthorn Fatty Acid

Sea buckthorn oil obtained from sea buckthorn seeds was separated into an oil alcohol moiety and a glycerol moiety of the sea buckthorn oil by treatment with ethanol and sodium hydroxide (caustic soda), and then carboxylic acid was reduced through hydrochloric acid treatment and a fatty acid was obtained from the alcohol moiety by hexane fractionation.

1-2. Sea Buckthorn Ceramide

The sea buckthorn fatty acid prepared in Example 1-1 was dissolved in ethyl acetate and then sodium methoxide and phytosphingosine were added thereto. After reaction at 50° C. for 2 hours, the corresponding reaction solution was cooled to 5° C. and filtered to obtain a white filtrate.

The obtained white filtrate was dried, and then was analyzed by silica thin layer chromatography (development conditions: chloroform+methanol+formic acid=190:15:1, color development with 10% sulfuric acid) to confirm a sea buckthorn ceramide.

1-3. Novel Sphingolipid

The sea buckthorn ceramide prepared in Example 1-2 was dissolved in ethyl acetate and then treated with glacial acetic acid and triethylamine. After reaction at 50° C. for 2 hours, a saturated aqueous sodium chloride solution was added at the same amount as the ethyl acetate at the initial stage, followed by being left to stand, and the lower layer was removed. The upper layer was treated with sodium sulfate, and then subjected to concentrated under reduced pressure using an excess of ethanol to remove the residue ethyl acetate, thereby obtaining a colorless liquid.

The white filtrate thus obtained was analyzed by high performance liquid chromatography (mobile phase: chloroform+methanol=96:4, normal phase stationary phase, light scattering detector) to confirm O-acylated moiety peaks of a sphingolipid represented by Chemical Formula 7 (see FIG. 1).

Test Example 1: Melting Point Assessment

The sea buckthorn ceramide prepared in Example 1-2 and the novel sphingolipid (O-acylated sea buckthorn ceramide) prepared in Example 1-3 were measured for melting point.

As a result of testing, the melting point of the sea buckthorn ceramide of Example 1-2 was 110° C. corresponding to a high temperature, but the melting point of the novel sphingolipid of Example 1-3 was 15° C., indicating that the novel sphingosine is present in a liquid phase at room temperature (see Table 1).

TABLE 1

| Classification | Sea buckthorn ceramide | Novel sphingolipid (O-acylated sea buckthorn ceramide) |
| --- | --- | --- |
| Melting point (° C.) | 110° C. | 15° C. |

Test Example 2: Chromatography Analysis

The sea buckthorn ceramide prepared in Example 1-2 and the novel sphingolipid (acylated sea buckthorn ceramide) prepared in Example 1-3 were developed by silica gel thin layer chromatography under solvent conditions of chloroform+methanol+formic acid=190:15:1 and color-developed with 10% sulfuric acid to confirm spots. The results are shown in FIG. 2.

Figure 2:
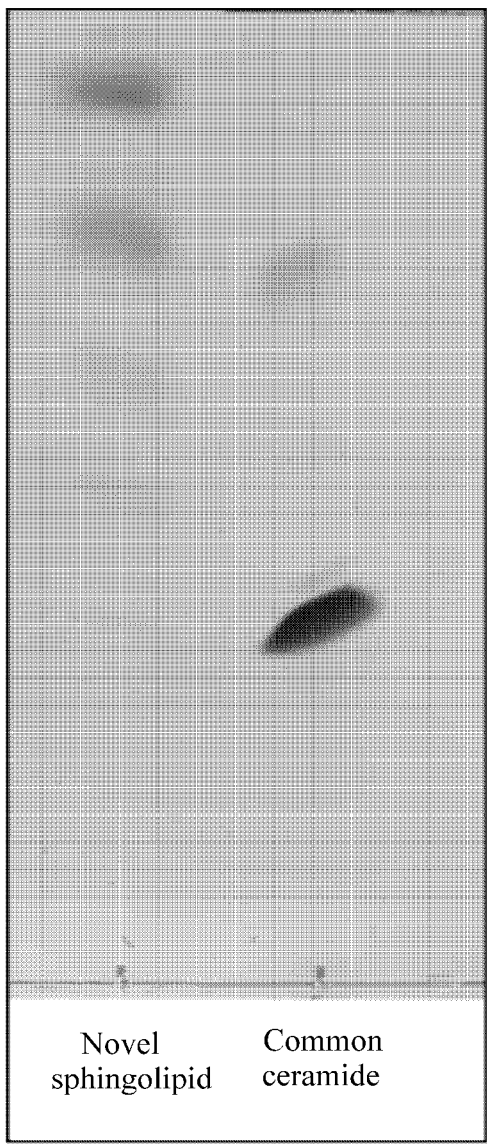
FIG. 2 shows the thin layer chromatography analysis results of a novel sphingolipid according to an embodiment of the present invention.

As a result of testing, the novel sphingolipid of the present invention was acylated and thus the Rf value thereof was higher than that of an existing ceramide (see FIG. 2).

Test Example 3: Oil Miscibility at Room Temperature

Figure 3:
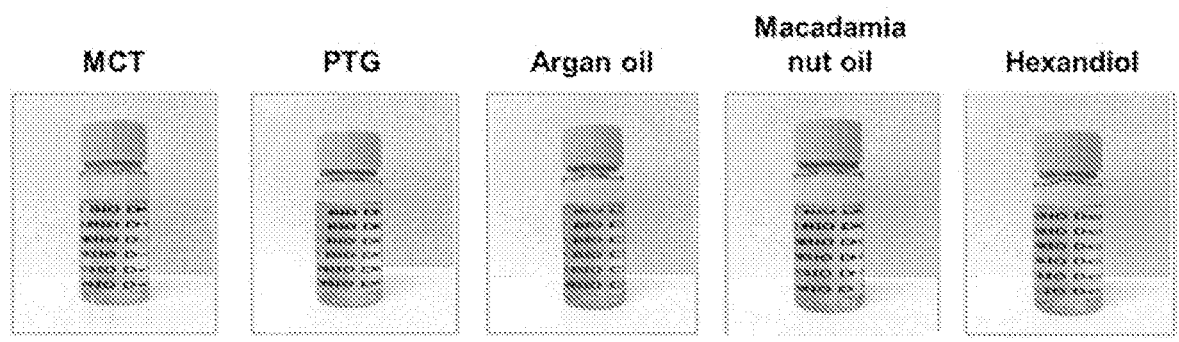
FIG. 3 shows images illustrating oil solubility of a novel sphingolipid of the present invention.

The novel sphingolipid prepared in the example was mixed with various oils to assess the solubility at room temperature, and the results are shown in Table 2 and FIG. 3.

As shown in Table 2, the novel sphingolipid prepared in the present invention had excellent solubility and miscibility in various plant and animal oils. Particularly, the novel sphingolipid had excellent solubility and dispersibility in oils at room temperature, and it can be therefore seen that the novel sphingolipid can be easily prepared into various formulations without conventional emulsifiers or separate high-temperature processes.

TABLE 2

| Oil | Amount of sphingolipid (O-acylated ceramide) added | | | | | | | | |
|---|---|---|---|---|---|---|---|---|---|
| | 0.1% | 0.3% | 0.5% | 0.8% | 1.0% | 1.5% | 2.0% | 3.0% | 5.0% |
| Caprylic/Capric triglyceride | ++ | ++ | ++ | ++ | ++ | ++ | ++ | ++ | ++ |
| Macadamia nut oil | ++ | ++ | ++ | ++ | ++ | ++ | + | + | + |
| Coconut oil | ++ | ++ | ++ | ++ | ++ | ++ | ++ | ++ | ++ |
| Jojoba oil | ++ | ++ | ++ | ++ | ++ | ++ | + | + | + |
| Avocado oil | ++ | ++ | ++ | ++ | ++ | ++ | ++ | ++ | ++ |
| Hydrogenated polyisobutene | ++ | ++ | ++ | ++ | ++ | ++ | + | + | + |
| Pentylene glycol | ++ | ++ | ++ | ++ | ++ | + | + | + | + |

− Non-soluble
+ Soluble (Phase separation occurred after coolingto room temperature)
++ Very soluble (Phase separation did not occurafter cooling to room temperature)

Formulation Example 1: Preparation of Cream

A cream formulation applicable to the human body was prepared using the liquid-phase sphingolipid, prepared in the example, by a common method according to the composition shown in Table 3. In Table 3, the unit of content of each ingredient was wt %.

TABLE 3

| | | Content (wt %) | |
|---|---|---|---|
| Product name | INCI name | Comparative Example 2 | Example 2 |
| Purified water | Purified water | Remainder | Remainder |
| EDTA-2NA | DISODIUM EDTA | 0.02 | 0.02 |
| *CENTELLA ASIATICAL EXTRCT* | *CENTELLA* ASIATICAL EXTRCT | 0.05 | 0.05 |
| DEKABEN CP | CHLORPHENESIN | 0.12 | 0.12 |
| GLYCERIN | GLYCERIN | 7 | 7 |
| 1,3-BG | BUTYLENE GLYCOL | 5 | 5 |
| AMINOCOAT | BETAINE | 1 | 1 |
| OLIVEM1000 | CETEARYL OLIVATE, SORBITAN OLIVATE | 1 | 1 |
| CP940 (2%) | CARBOMER | 7.5 | 7.5 |
| SODIUM HYALURONATE | SODIUM HYALURONATE | 0.05 | 0.05 |
| MONTANOV L | C14-22 ALCOHOLS, C12-20 ALKYL GLUCOSIDE | 2 | 2 |
| LANETTE O | CETEARYL ALCOHOL | 2 | 2 |
| Sphingolipid of Example 1-3 | Sphingolipid of Example 1-3 (O-acylated ceramide) | - | 0.2 |
| DERMOFEEL BGC | BUTYLENE GLYCOL DICARRYLATE/DICAPRATE | 4 | 4 |
| SALACOS 5408 | PENTAERYTHRITYL TETRAETHYLHEXANOATE | 2 | 2 |
| EXOLIVE | SQUALANE | 2 | 2 |
| CEH | CETYL ETHYLHEXANOATE | 2 | 2 |
| LIPEX SHEA | *BUTYROSPERMUM* PARII (SHEA BUTTER) | 1.5 | 1.5 |

TABLE 3-continued

|  |  | Content (wt %) | |
|---|---|---|---|
| Product name | INCI name | Comparative Example 2 | Example 2 |
| KF995 | CYCLOPENTASILOXANE | 5 | 5 |
| ARGININE (10%) | ARGININE | 1.5 | 1.5 |
| SEPIPOLUS 400 | Polyacrylate-13, Polyisobutene, Polysorbate 20 | 0.5 | 0.5 |
| PENOXYETHANOL | PHEOXYETHANOL | 0.2 | 0.2 |
| FRAGRANCE | FRAGRANCE | 0.2 | 0.2 |

Formulation Example 2: Preparation of Lip Balm

A cream formulation applicable to the human body was prepared by a common method according to the composition shown in Table 3. In Table 3, the unit of content of each ingredient was wt %.

TABLE 4

| Product name | INCI name | Content (%) Example 3 |
|---|---|---|
| Sphingolipid of Example 1-3 | Sphingolipid of Example 1-3 (O-acylated ceramide) | 0.05 |
| Candelillia Wax | Candelillia Wax | 8.0 |
| Cutina CP | Cetyl palmitate | 10.0 |
| Bees Wax | Bees wax | 7.0 |
| Shea Butter | Shea Butter | 10.0 |
| Macadamia oil | Macadamia oil | 10.0 |
| Vegetol MCT oil | Caprylic/Capric Triglyceride | 34.85 |
| Squalane | Squalane | 20.0 |
| Perfume | Fragrance | 0.1 |

Test Example 4: Skin Moisture Content

The cream formulation of the present invention was assessed for skin moisture content change as follows.

The cream containing the novel sphingolipid of Example 2 was used as a sample, and the cream containing no sphingolipid of Comparative Example 2 was used as a control group. The change in electrical conductivity according to the epidermal moisture content was numerically measured by using Corneometer, and the skin moisture content change between before and after use was measured. Specifically, the electrical conductivity of the skin was measured before each type of cream was applied, and while the creams of Example 2 and Comparative Example 2 were applied twice a day, the electrical conductivity was measured after 4 days, 7 days, 10 days, and 14 days. The results were expressed as percentage (%).

Figure 4:
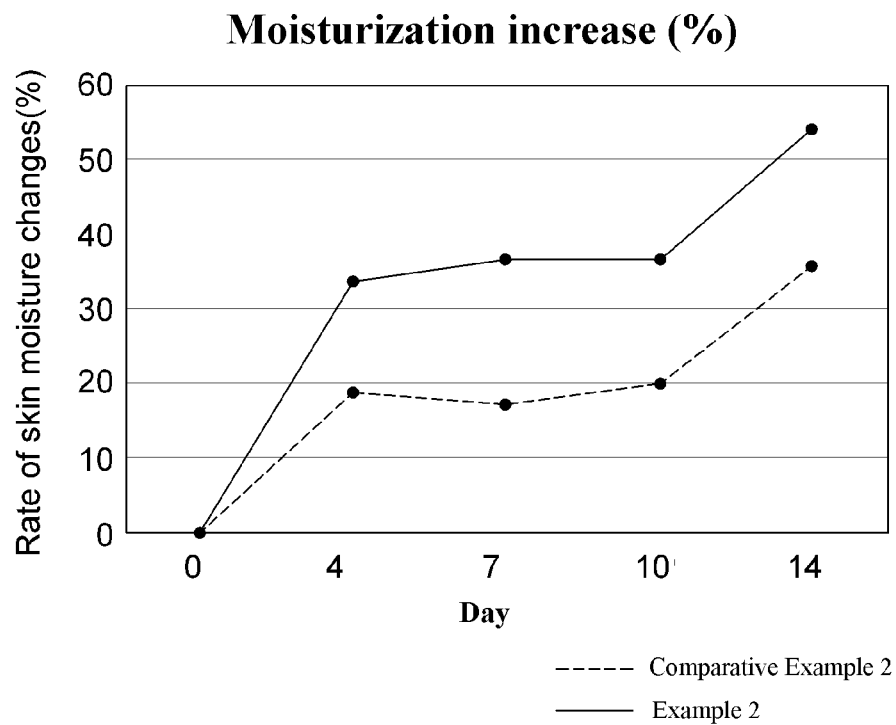
FIG. 4 is a graph showing moisture content results by clinical application of a cream formulation according to the present invention.

FIG. 4 shows the comparison test results of skin moisture content change over time of the novel sphingolipid-containing cream according to the present invention. Specifically, the cream of Example 2 continuously showed a significantly high moisture increase rate compared with Comparative Example 2, from immediately after use until the elapse of 14 days.

It can be therefore seen that the cosmetic composition containing the novel sphingolipid of the present invention increases a moisture increasing effect and thus shows excellent moisturizing effect and dry preventing effect.

Test Example 5: Skin Barrier Restoration Ability

The cream formulation of the present invention was assessed for change in skin barrier restoration ability as follows.

The cream containing the novel sphingolipid in Example 2 was used as a sample, and the cream containing no sphingolipid of Comparative Example 2 was used as a control group. The arm part was tape-stripped to cause skin barrier damage, and then the transepidermal water loss (TEWL) was measured by Tewameter (g/m$^2$/h). In addition, the skin barrier restoration ability according to the sample application was assessed.

Figure 5:
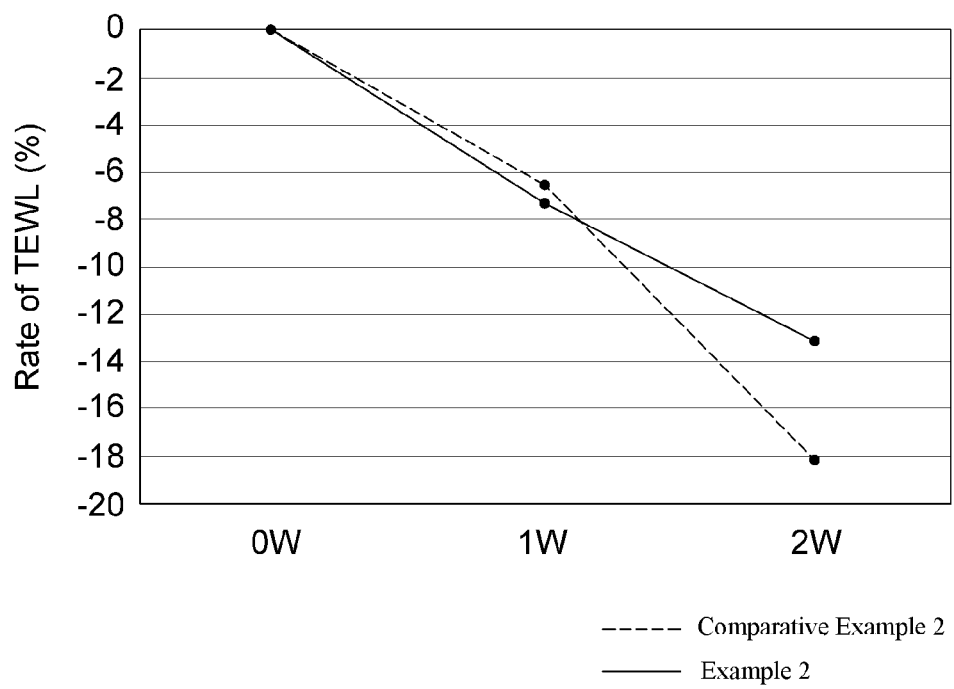
FIG. 5 is a graph showing the transepidermal water loss prevention results by clinical application of a cream formulation according to the present invention.

FIG. 5 shows the comparison test results of skin barrier restoration ability of the sphingolipid-containing cream according to the present invention by measuring the transepidermal moisture loss. Specifically, the cream of Example 2 showed smaller TEWL than the cream of Comparative Example 2. It can be therefore seen that the cosmetic composition containing the novel sphingolipid of the present invention has excellent skin barrier restoration efficacy.

Test Example 6: Lip Skin Barrier Restoration Ability

The cream formulation according to the present invention was assessed for lip moisturizing effects and lip texture changes as follows.

The lip balm containing the novel sphingolipid of Example 3 was applied to the lips, and the volumes (mm3) of depressed sites in the lip skin were measured using Antera 3D CS. The measurement results are shown in FIG. 6.

Figure 6:
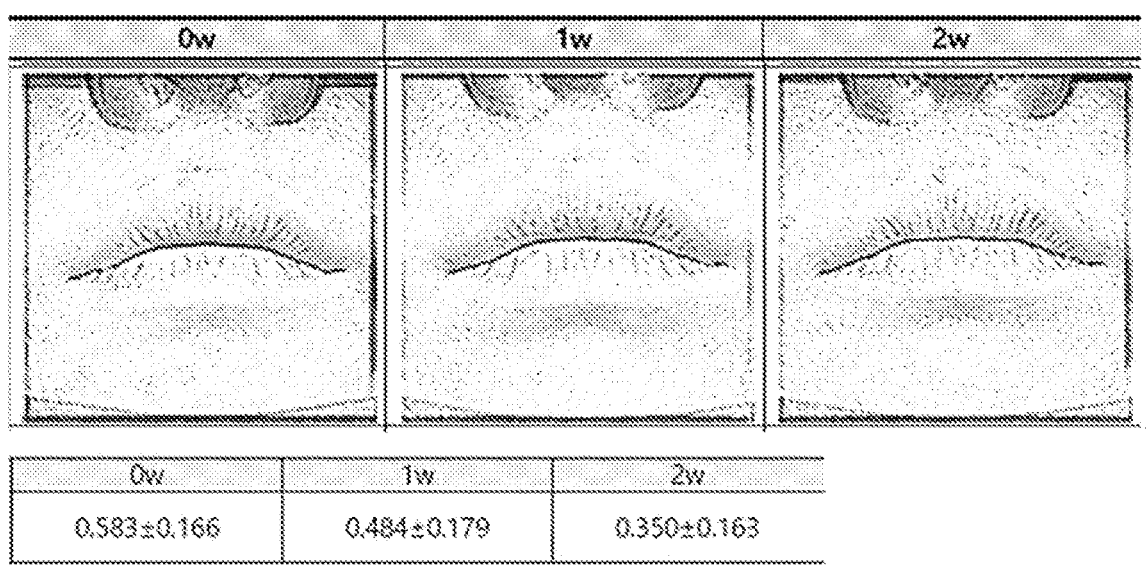
FIG. 6 shows lip water retention and lip texture changes by clinical application of a lip balm formulation according to the present invention.

As shown in FIG. 6, the sphingolipid-containing lip balm according to the present invention had a lower volume value in proportion to the period of application, compared with the control group (0 w). It can be therefore seen that the lip balm according to the present invention has an excellent lip skin texture improvement effect.

Test Example 7: Skin Protection from Ultraviolet (UV) Light

The cream formulation according to the present invention was assessed for skin soothing (redness relief) and protecting efficacy against an external stimulus (ultraviolet light, UV) as follows.

The cream containing the novel sphingolipid of Example 2 was used as a sample, and the cream not containing the novel sphingolipid of Comparative Example 2 was used as a control group. Specifically, the inner part of the upper arm of a subject, which was set as a test site, was washed with a detergent, and then the subject was subjected to skin stabilization for at least 30 minutes in a place where constant temperature and constant humidity (24±1° C., R.H. 50±5%) was maintained. Thereafter, the test site was repeatedly irradiated with UV (UV B: 2-3 MED, UV A: 60-100 J/cm$^2$) to measure the minimal dose for causing erythema, that is, the minimal erythema dose (MED). The results are shown in FIG. 7.

Figure 7:
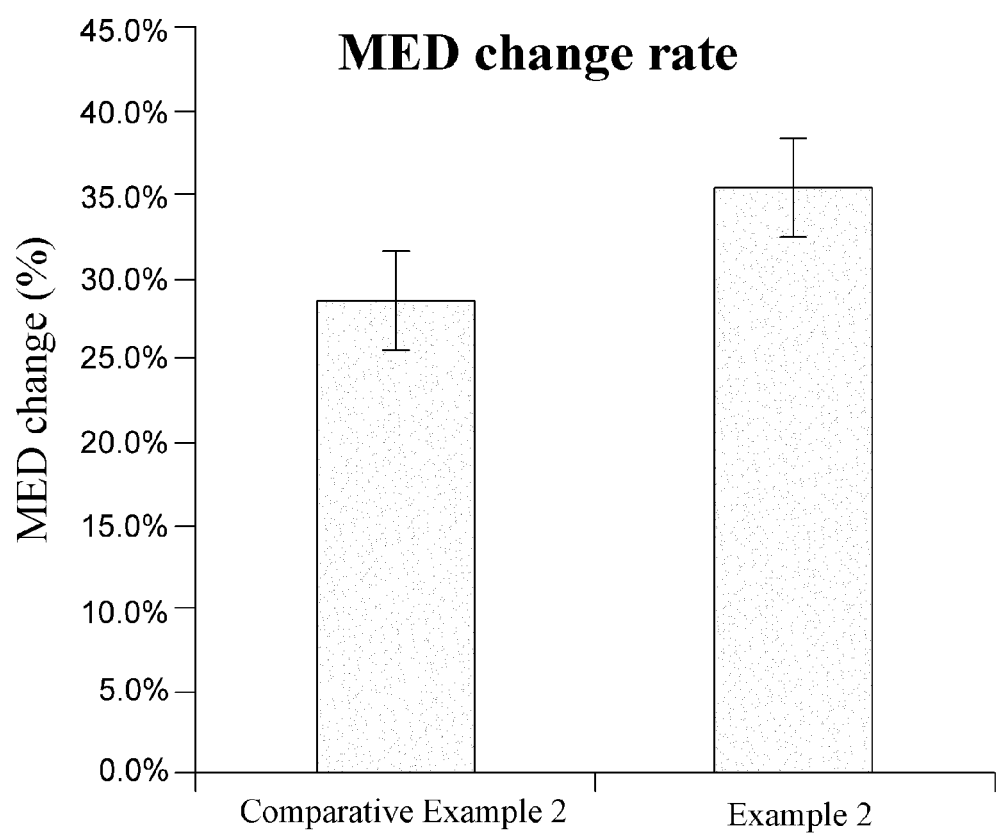
FIG. 7 is a graph showing minimal erythema dose (MED) changes by clinical application of a cream formulation according to the present invention.

As shown in FIG. 7, the sphingolipid-containing cream according to the present invention showed higher MED compared with the control group. This indicates that the minimum dose for causing erythema was high, and it can be therefore seen that the cream of the present invention prevents skin damage induced by ultraviolet light to exhibit a skin protecting effect.

The invention claimed is:

1. A sphingolipid represented by Chemical Formula 1:

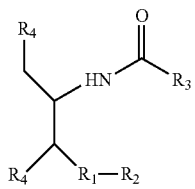

[Chemical Formula 1]

wherein:
$R_1$ is $CH_2$—$CH_2$, $CH$=$CH$, or $C(H)$ $R_4$—$CH_2$;
$R_2$ is a saturated or unsaturated aliphatic hydrocarbon group of 12 to 28 carbon atoms;
$R_3$ is a saturated or unsaturated aliphatic hydrocarbon group of 12 to 28 carbon atoms substituted or unsubstituted with a hydroxyl group; and
a plurality of $R_4$'s are the same as or different from each other and are each independently an aliphatic acyl group of 1 to 6 carbon atoms or a hydroxyl (OH) group, provided that at least one of the plurality of $R_4$'s contains at least an aliphatic acyl group of 1 to 6 carbon atoms.

2. The sphingolipid of claim 1, wherein the sphingolipid represented by Chemical Formula 1 contains an acetyl ($CH_3CO$—) group in at least one of the plurality of $R_4$'s.

3. The sphingolipid of claim 1, wherein the sphingolipid is represented by any one of Chemical Formulas 2 to 7,

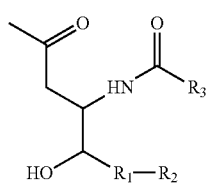

[Chemical Formula 2]

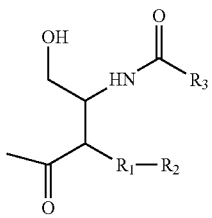

[Chemical Formula 3]

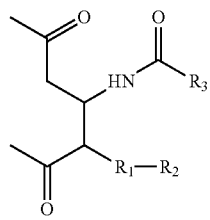

[Chemical Formula 4]

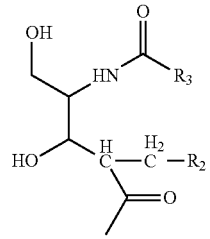

[Chemical Formula 5]

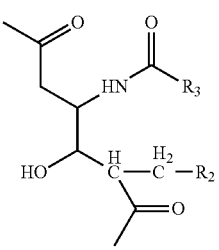

[Chemical Formula 6]

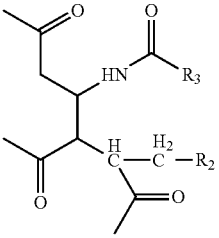

[Chemical Formula 7]

wherein in Chemical Formulas 2 to 7,
$R_1$ to $R_3$ are each defined as in claim 1.

4. The sphingolipid of claim 1, wherein $R_3$ of Chemical Formula 1 includes, as a raw material, an oil derived from at least one supply source of sea buckthorn, palm, sunflower, rapeseed, canola, olive, coconut, soybean, horse, cattle, sheep, bee, fish, crustacean, and human.

5. The sphingolipid of claim 1, wherein the sphingolipid has a melting point (mp) of 40° C. or lower.

6. The sphingolipid of claim 1, wherein the sphingolipid has solubility in at least one oil of plant oils, animal oils, fraction oils, and synthetic oils.

7. The sphingolipid of claim 1, wherein in thin layer chromatography (TLC) using development solvents of chloroform:methanol: formic acid=190:15:1 (volume ratio), the Rf value of the sphingolipid is higher than the Rf value of an unacylated ceramide.

8. The sphingolipid of claim 1, wherein the sphingolipid has a pH of 3 to 7.

9. A composition for external application to the skin comprising, as an active ingredient, the sphingolipid of claim 1, a pharmaceutically acceptable salt thereof, or a solvate thereof.

10. The composition of claim 9, wherein the composition is used for anti-inflammation, improving moisturization, or enhancing skin barriers.

11. The composition of claim 9, wherein the composition is used for repairing skin damage induced by ultraviolet (UV) light or alleviating skin irritation.

12. The composition of claim 9, wherein the composition is used for hair damage prevention, hair moisturization, lip moisturization, or lip protection.

13. The composition of claim 9, wherein the sphingolipid is contained at an amount of 0.00001 to 50 wt % relative to the total weight of the composition.

14. The composition of claim 9, wherein the composition further comprises at least one of phytosphingosine, sphingosine, and sphinganine.

15. The composition of claim 9, wherein the composition further comprises at least one of ceramide 1 (EOS), ceramide 2 (NS), ceramide 3 (NP), ceramide 4 (EOH), ceramide 5 (AS), ceramide 6 (NH), ceramide 7 (AP), ceramide 8 (AH), and ceramide 9 (EOP).

16. The composition of claim 9, wherein the composition is an oil formulation containing no emulsifier.

17. A pharmaceutical composition comprising, as an active ingredient, the sphingolipid of claim 1, a pharmaceutically acceptable salt thereof, or a solvate thereof.

18. A cosmetic composition comprising, as an active ingredient, the sphingolipid of claim 1, a pharmaceutically acceptable salt thereof, or a solvate thereof.

19. A quasi-drug composition comprising, as an active ingredient, the sphingolipid of claim 1, a pharmaceutically acceptable salt thereof, or a solvate thereof.

* * * * *